(12) United States Patent
Yoshida et al.

(10) Patent No.: US 11,333,250 B2
(45) Date of Patent: May 17, 2022

(54) SEAL RING

(71) Applicant: NOK CORPORATION, Tokyo (JP)

(72) Inventors: Yusuke Yoshida, Kitaibaraki (JP); Koji Watanabe, Kitaibaraki (JP)

(73) Assignee: NOK CORPORATION, Tokyo (JP)

( * ) Notice: Subject to any disclaimer, the term of this patent is extended or adjusted under 35 U.S.C. 154(b) by 159 days.

(21) Appl. No.: 16/621,341

(22) PCT Filed: Jun. 27, 2018

(86) PCT No.: PCT/JP2018/024323
§ 371 (c)(1),
(2) Date: Dec. 11, 2019

(87) PCT Pub. No.: WO2019/004268
PCT Pub. Date: Jan. 3, 2019

(65) Prior Publication Data
US 2021/0140545 A1 May 13, 2021

(30) Foreign Application Priority Data
Jun. 27, 2017 (JP) .............................. JP2017-125545

(51) Int. Cl.
*F16J 15/3284* (2016.01)
(52) U.S. Cl.
CPC ................................ *F16J 15/3284* (2013.01)
(58) Field of Classification Search
CPC ........... F16J 15/16; F16J 15/3284; F16J 15/54
See application file for complete search history.

(56) References Cited

U.S. PATENT DOCUMENTS

| 5,632,494 A | 5/1997 | Oka |
| 7,523,944 B2 * | 4/2009 | Hatori .................... F16J 15/441 277/460 |

(Continued)

FOREIGN PATENT DOCUMENTS

| CN | 104620028 A | 5/2015 |
| CN | 105074298 A | 11/2015 |

(Continued)

OTHER PUBLICATIONS

Japanese Office Action dated Dec. 22, 2020 (corresponding to JP 2019229441).

(Continued)

*Primary Examiner* — Gilbert Y Lee
(74) *Attorney, Agent, or Firm* — Harness, Dickey & Pierce, P.L.C.

(57) ABSTRACT

A seal ring capable of stabilizing sealing performance while reducing rotation torque. A seal ring 100 has a plurality of first dynamic pressure generation groove 131 and a plurality of second dynamic pressure generation groove 132 on an outer peripheral surface thereof with intervals in the circumferential direction, the plurality of first dynamic pressure generation groove 131 extending from a position close to a first side surface 100A with respect to the center of width in an axial direction to the first side surface 100A and configured to generate dynamic pressure with relative rotation between a housing and the seal ring 100, and the plurality of second dynamic pressure generation groove 132 extending from a position close to a second side surface 100B with respect to the center of width in the axial direction to the second side surface 100B and configured to generate dynamic pressure with the relative rotation between the housing and the seal ring 100.

4 Claims, 10 Drawing Sheets

(56) References Cited

U.S. PATENT DOCUMENTS

| | | | |
|---|---|---|---|
| 10,487,947 B2* | 11/2019 | Gronitzki | F16J 15/3284 |
| 2012/0018957 A1* | 1/2012 | Watanabe | F16J 15/441 |
| | | | 277/387 |
| 2015/0048574 A1 | 2/2015 | Seki et al. | |
| 2015/0108720 A1 | 4/2015 | Seki et al. | |
| 2015/0204204 A1 | 7/2015 | Seki et al. | |
| 2015/0362074 A1* | 12/2015 | Seki | F16J 15/441 |
| | | | 277/512 |
| 2015/0369367 A1* | 12/2015 | Kuroki | F16J 15/24 |
| | | | 277/543 |
| 2016/0116066 A1 | 4/2016 | Watanabe et al. | |
| 2016/0186862 A1* | 6/2016 | Kondou | C09K 3/1025 |
| | | | 277/500 |
| 2017/0009889 A1 | 1/2017 | Seki et al. | |
| 2017/0343110 A1 | 11/2017 | Seki et al. | |

FOREIGN PATENT DOCUMENTS

| | | |
|---|---|---|
| CN | 105308370 A | 2/2016 |
| CN | 105917151 A | 8/2016 |
| DE | 1934396 U | 3/1966 |
| EP | 2960554 A1 | 12/2015 |
| JP | H10-141506 A | 5/1998 |
| JP | 3437312 B2 | 8/2003 |
| JP | 4872152 B2 | 2/2012 |
| JP | 2014055645 A | 3/2014 |
| KR | 10-2014-0111318 A | 9/2014 |
| WO | 2008/001638 A1 | 1/2008 |
| WO | 2014196403 A1 | 12/2014 |

OTHER PUBLICATIONS

English Machine Translation of Chinese Office Action dated Feb. 20, 2021 (corresponding to CN 201880039586.9).

German Office Action dated May 20, 2021 with English translation (corresponding to DE112018003269.8).

Chinese Office Action dated Aug. 18, 2021 (corresponding to CN 2021081301774510).

Korean Office Action dated Oct. 20, 2021 (corresponding to KR 10-2019-7037559).

* cited by examiner

SEAL RING

CROSS-REFERENCE TO RELATED APPLICATIONS

This application is a National Stage of International Application No. PCT/JP2018/024323, filed Jun. 27, 2018 (now WO 2019/004268A1), which claims priority to Japanese Application No. 2017-125545, filed Jun. 27, 2017. The entire disclosures of each of the above applications are incorporated herein by reference.

FIELD

The present disclosure relates to a seal ring for sealing an annular gap between a shaft and a shaft hole of a housing.

BACKGROUND

In automatic transmissions (AT) and continuously variable transmissions (CVT) for automobiles, a seal ring for sealing an annular gap between a shaft and a housing that rotate relative to each other is provided in order to hold hydraulic pressure. In recent years, the reduction in fuel consumption has been advanced for measures for environmental issues, and demands to reduce rotation torque have been increased for the seal ring. A conventional technique reduces the contact area of a sliding portion between a seal ring and a side surface of an annular groove in which the seal ring is mounted. A conventional seal ring will be described with reference to FIG. 10.

FIG. 10 is a schematic cross-sectional diagram illustrating a conventional seal ring in use. A seal ring 300 is mounted in an annular groove 510 provided in an outer circumference of a shaft 500. The seal ring 300 comes into close contact with an inner peripheral surface 610 of a shaft hole of a housing 600 through which the shaft 500 is inserted, and comes into contact with the side wall surface of the annular groove 510 so as to slide on it, thereby sealing an annular gap between the shaft 500 and the shaft hole of the housing 600.

The seal ring 300 has a pair of recesses 311 and 312 extending in the circumferential direction provided in both side surfaces on an inner peripheral surface side. Thus, a region denoted by T0 in FIG. 10 is an effective pressure receiving region of the seal ring 300 when the seal ring 300 is pushed by fluid to be sealed from a high pressure side (denoted by P in FIG. 10) to the low pressure side (denoted by Q in FIG. 10) in the axial direction. The effective pressure receiving region T0 is a region where the recesses 311 and 312 are not provided in the side surfaces of the seal ring 300, because forces applied to the seal ring 300 in the axial direction are canceled in the regions where the recesses 311 and 312 are provided, since fluid pressure acts from both sides in the axial direction. The area of the region T0 extending along the entire circumference is an effective pressure receiving area in the axial direction.

A region denoted by H0 in FIG. 10 is an effective pressure receiving region of the seal ring 300 in the direction of which the seal ring 300 is pushed radially outward by fluid to be sealed from the inner peripheral surface side to the outer peripheral surface side. The effective pressure receiving region H0 corresponds to the thickness of the seal ring 300 in the axial direction. The area of the region H0 extending along the entire circumference is a pressure receiving area in the radial direction.

The configuration of (length of region T0)<(length of region H0) allows the seal ring 300 to slide on the side wall surface of the annular groove 510. Decreasing the length of the pressure receiving region T0 as much as possible can reduce rotation torque.

A contact region of the seal ring 300 with the side wall surface of the annular groove 510 is a region denoted by U0 in FIG. 10. The seal ring 300 comes into contact with the side wall surface of the annular groove 510 only in a part of its low pressure-side side surface in which the recess 312 is not provided other than a part exposed to the gap between the shaft 500 and the housing 600. Thus, the contact region U0 of the seal ring 300 depends on dimensions of the gap between the shaft 500 and the housing 600 and dimensions of chamfers provided on the annular groove 510. Thus, the contact area of the seal ring 300 with the side wall surface of the annular groove 510 may be so small that sealing performance may decrease in some use environments. In addition, the sealing performance may not be stable because the contact region may change in some use environments.

CITATION LIST

Patent Literature

[PTL 1] Japanese Patent No. 3437312
[PTL 2] Japanese Patent No. 4872152
[PTL 3] WO 2014/196403

SUMMARY

Technical Problem

The present disclosure provides a seal ring capable of stabilizing sealing performance while reducing rotation torque.

Solution to Problem

The present disclosure employs the following measures in order to solve the above described issues.

Specifically, a seal ring of the present disclosure is a seal ring that is to be mounted to an annular groove provided in an outer circumference of a shaft and is configured to seal an annular gap between the shaft and a housing that rotate relative to each other so as to hold fluid pressure in a region to be sealed, wherein the fluid pressure in the region is capable of changing, the seal ring being configured to come into close contact with a side wall surface of the annular groove on a low pressure side and slide on an inner peripheral surface of a shaft hole of the housing through which the shaft is inserted, wherein the seal ring has, on an outer peripheral surface thereof, with intervals in a circumferential direction, a first dynamic pressure generation groove extending from a position close to a first side surface of the seal ring with respect to the center of width in an axial direction to the first side surface and configured to generate dynamic pressure with relative rotation between the housing and the seal ring; and a second dynamic pressure generation groove extending from a position close to a second side surface of the seal ring with respect to the center of width in the axial direction to the second side surface and configured to generate dynamic pressure with the relative rotation between the housing and the seal ring.

The configuration in which the seal ring is configured to come into close contact with the side wall surface of the annular groove on the low pressure side and slide on the inner peripheral surface of the shaft hole of the housing can stabilize the area of the sliding portion irrespective of the size of the annular gap between the shaft and the housing. This stabilizes the sealing performance. The first dynamic pressure generation grooves and the second dynamic pressure generation grooves provided on the outer peripheral surface of the seal ring can reduce sliding resistance, thus rotation torque can be reduced.

A side surface of the first dynamic pressure generation groove on an upstream side in a rotation direction of the seal ring relative to the housing may be formed by an inclined surface, wherein the depth of the inclined surface becomes gradually shallower toward the upstream side, and a side surface of the second dynamic pressure generation groove on the upstream side in the rotation direction of the seal ring relative to the housing may be formed by an inclined surface, wherein the depth of the inclined surface becomes gradually shallower toward the upstream side.

This allows fluid to be sealed in the first dynamic pressure generation groove and the second dynamic pressure generation groove to flow from the inside of the grooves to the outer peripheral surface of the seal ring when the housing and the seal ring rotate relative to each other, thus dynamic pressure is generated.

A plurality of protrusion that protrude radially inward may be provided on the inner peripheral surface side of the seal ring with intervals in the circumferential direction.

The above described configurations can be employed in combination.

Advantageous Effects of the Disclosure

As described above, according to the present disclosure, the sealing performance can be stabilized while reducing rotation torque.

DRAWINGS

DETAILED DESCRIPTION

Figure 1:
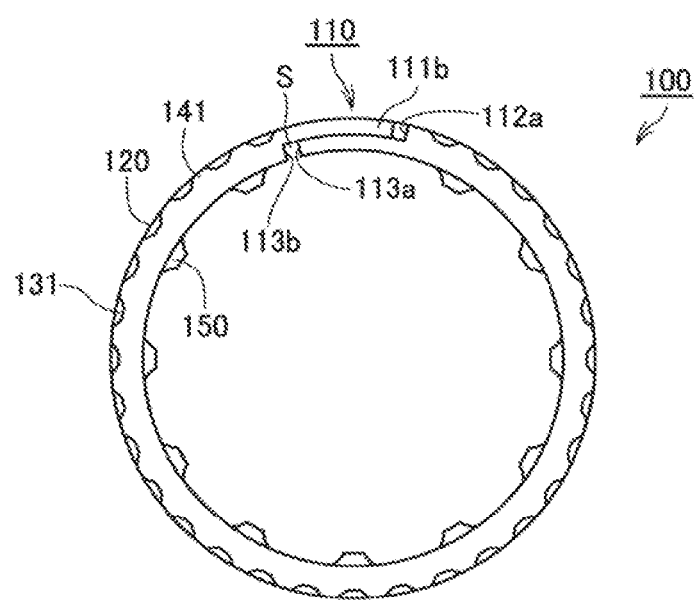
FIG. 1 is a side view of a seal ring according to an embodiment.

Referring to the drawings, modes for embodying the present disclosure are exemplified in detail below on the basis of an embodiment. Note that the dimensions, materials, shapes, and relative arrangement of components described in the embodiment are not intended to limit the scope of the present disclosure to only the described ones unless otherwise specified.

Embodiment

Figure 2:
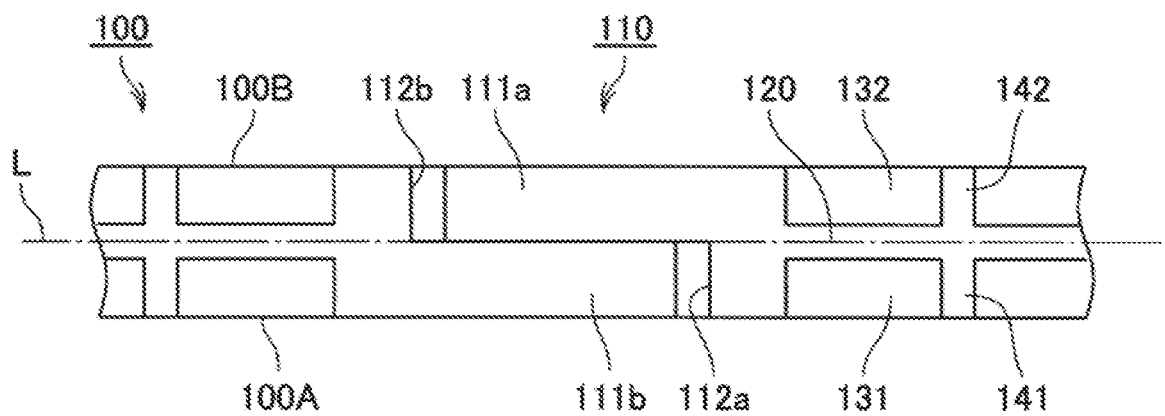
FIG. 2 is a partial view of the seal ring viewed from the outer peripheral surface side of the seal ring.
Figure 3:
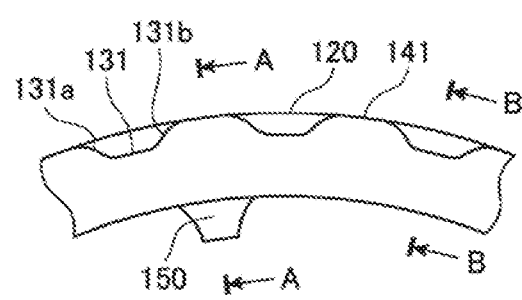
FIG. 3 is a partial enlarged side view of the seal ring.
Figure 4:
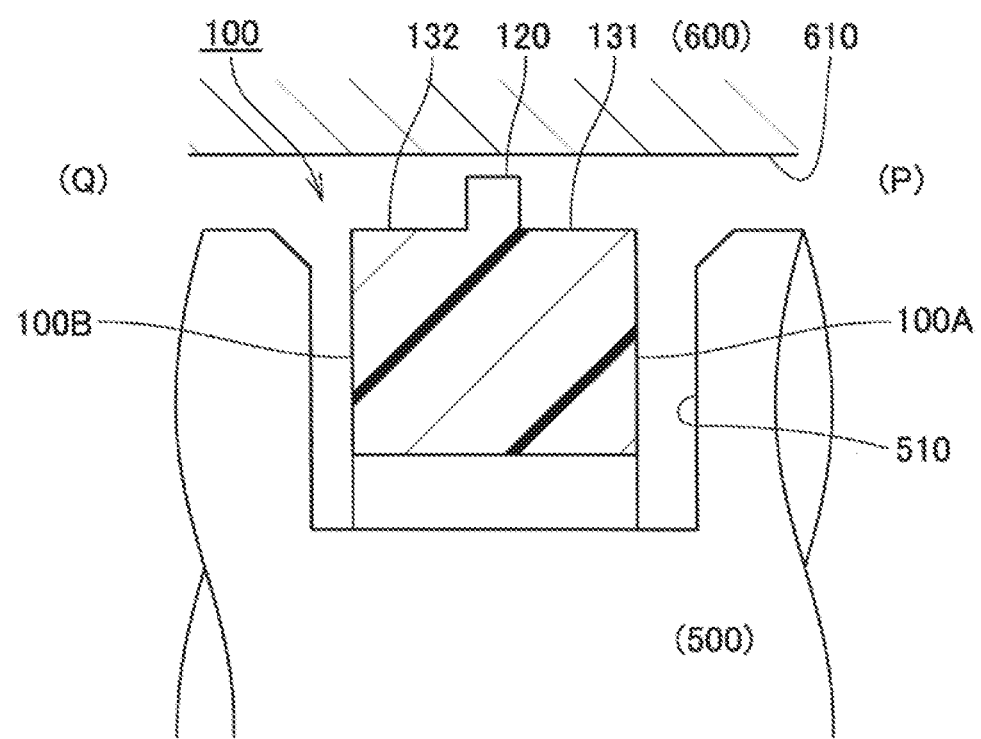
FIG. 4 is a schematic cross-sectional view illustrating the seal ring in use.
Figure 5:
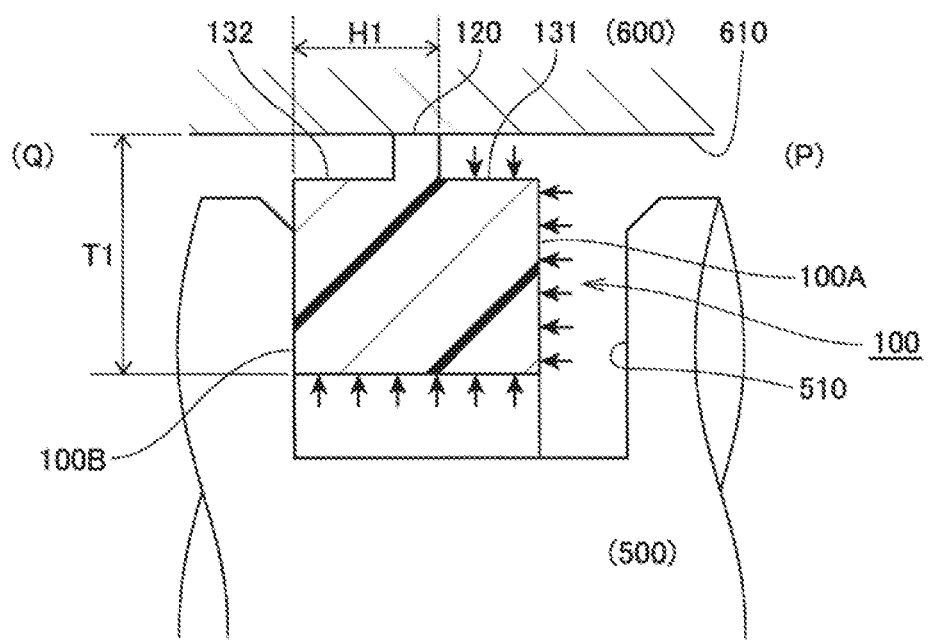
FIG. 5 is a schematic cross-sectional view illustrating the seal ring in use.
Figure 6:
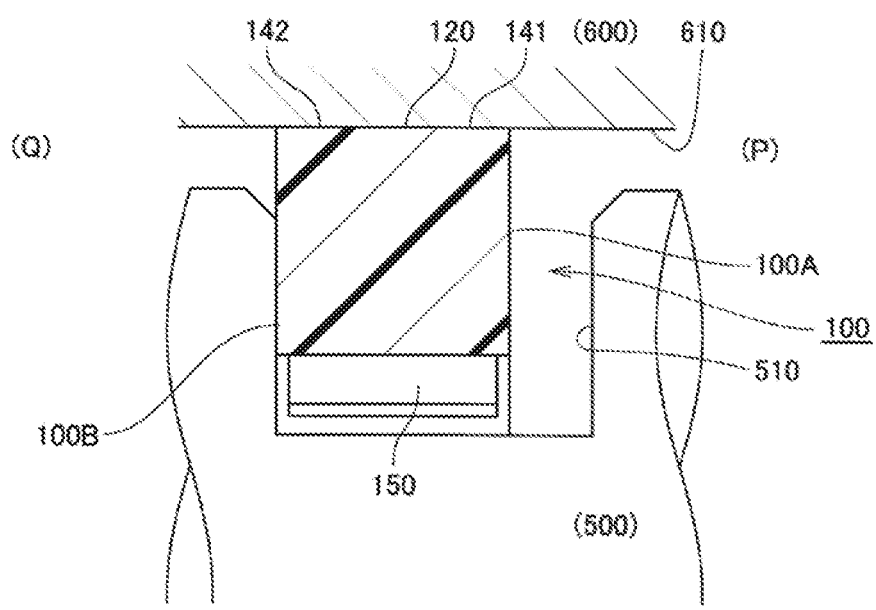
FIG. 6 is a schematic cross-sectional view illustrating the seal ring in use.

Referring to FIG. 1 to FIG. 6, a seal ring according to an embodiment is described. FIG. 1 is a side view of the seal ring. FIG. 2 is a partial view of the seal ring viewed from the outer peripheral surface side, illustrating near an abutment portion provided to the seal ring. FIG. 3 is a partial enlarged side view of the seal ring. FIGS. 4 to 6 are schematic cross-sectional views illustrating the seal ring in use. FIGS. 4 and 5 illustrate cross-sectional views of the seal ring taken along a plane denoted by BB in FIG. 3. FIG. 6 illustrates a cross-sectional view of the seal ring taken along a plane denoted by AA in FIG. 3. In the following, "axial direction" means a direction in which the center axes of a shaft 500 and a seal ring 100 extend.

<Configuration of Seal Ring>

A seal ring 100 according to the present embodiment is mounted to an annular groove 510 provided in an outer circumference of a shaft 500, and seals an annular gap between the shaft 500 and a housing 600, that is, between the shaft 500 and an inner peripheral surface 610 of a shaft hole of the housing 600 through which the shaft 500 is inserted, the shaft 500 and the housing 600 relatively rotating. As illustrated in FIG. 5, the annular gap between the shaft 500 and the inner peripheral surface 610 of the shaft hole of the housing 600 is partitioned by the seal ring 100 into a region P and a region Q. The seal ring 100 holds fluid pressure (hydraulic pressure in the present embodiment) in a region to be sealed where the fluid pressure may change. In the present embodiment, the fluid pressure in the right region P in FIGS. 4 to 6 changes and the seal ring 100 holds the fluid pressure in the region P, which is a region to be sealed. Note that, when an engine of an automobile is stopped, fluid pressure in a region to be sealed becomes low under an unloaded state, and when the engine is started, the fluid pressure in the region to be sealed increases.

The seal ring 100 is made of resin material, such as polyetheretherketone (PEEK), polyphenylenesulfide (PPS), and polytetrafluoroethylene (PTFE). The perimeter of the outer peripheral surface of the seal ring 100 is shorter than the perimeter of the inner peripheral surface of the shaft hole of the housing 600, that is, no interference is provided.

The seal ring 100 has an abutment portion 110 at one location in the circumferential direction. A plurality of first dynamic pressure generation groove 131 and a plurality of second dynamic pressure generation groove 132 are each provided on the outer peripheral surface of the seal ring 100 with intervals in the circumferential direction. A plurality of protrusion 150 protruding radially inward are provided on the inner peripheral surface of the seal ring 100 with intervals in the circumferential direction. The plurality of protrusion 150 prevent the seal ring 100 from greatly protruding beyond the level of the outer peripheral surface of the shaft 500 after the seal ring 100 is mounted to the annular groove 510 and before the seal ring 100 is installed into the shaft hole of the housing 600. Specifically, when the seal ring 100 hangs downward due to its weight, some protrusions 150 on the upper side come into contact with the groove bottom of the annular groove 510. This prevents the seal ring 100 from greatly protruding downward beyond the level of the outer peripheral surface of the seal ring 100. Thus, the working efficiency of assembling can be improved when inserting the shaft 500 to the shaft hole of the housing 600 with the seal ring 100 mounted to the annular groove 510.

The above explanation of the seal ring 100 that the abutment portion 110, the plurality of first dynamic pressure generation groove 131, the plurality of second dynamic pressure generation groove 132, and the plurality of protrusion 150 are formed on an annular member having a rectangular cross-section is intended to illustratively describe the shapes of members and not necessarily meant to limit the method for creating the members to processing an annular member having a rectangular cross-section to form the members. Each member may be obtained by cutting an annular member having a rectangular cross-section after molding. The plurality of first dynamic pressure generation groove 131 and the plurality of second dynamic pressure generation groove 132 may be obtained by cutting a member with the abutment portion 110 and the plurality of protrusion 150 molded in advance. The manufacturing method is not particularly limited.

The abutment portion 110 employs so-called special step cut having a step-like appearance when seen in any directions from the outer peripheral surface side and the both side wall surface side. Specifically, the seal ring 100 has a first fitting protruding portion 111a and a first fitting recess 112a on the outer peripheral surface on one side across the cutting portion, and a second fitting recess 112b to which the first fitting protruding portion 111a is fitted and a second fitting protruding portion 111b to be fitted to the first fitting recess 112a on the outer peripheral surface on the other side. A gap S is formed in the seal ring 100 between a surface 113a of the inner peripheral surface on one side across the cutting portion and a surface 113b of the inner peripheral surface on the other side (see FIG. 1). Since the special step cut is a known technology, detailed descriptions thereof will be omitted. The special step cut has characteristics that stable sealing performance is maintained even when the perimeter of the seal ring 100 changes due to thermal expansion and contraction. Although the special step cut has been described as an example of the abutment portion 110, the abutment portion 110 may not limited thereto, that is, straight cut, bias cut, and step cut may be employed. When low-elasticity material (such as PTFE) is employed as the material of the seal ring 100, the seal ring 100 may be endless without providing the abutment portion 110.

The first dynamic pressure generation groove 131 extends from a position close to the first side surface 100A with respect to the center (denoted by L in FIG. 2) of width in the axial direction to the first side surface 100A. The first dynamic pressure generation groove 131 has side surfaces 131a and 131b on both sides in the circumferential direction with inclined surfaces whose depths become gradually shallower toward the both sides. The inclined surface has a so-called R surface which is curved when seen from the side-surface side of the seal ring 100. Thus, it can be said that the side surface (side surface 131a or side surface 131b) of the first dynamic pressure generation groove 131 on the upstream side in the rotation direction has an inclined surface whose depth becomes gradually shallower toward the upstream side irrespective of the rotation direction of the shaft 500 relative to the housing 600.

The second dynamic pressure generation groove 132 extends from a position close to the second side surface 1006 with respect to the center of width in the axial direction to the second side surface 1006. The second dynamic pressure generation groove 132 has side surfaces on both sides in the circumferential direction with inclined surfaces whose depths become gradually shallower toward the both sides. The inclined surface has a so-called R surface which is curved when seen from the side-surface side of the seal ring 100. Thus, it can be said that the side surface of the second dynamic pressure generation groove 132 on the upstream side in the rotation direction has an inclined surface whose depth becomes gradually shallower toward the upstream side irrespective of the rotation direction of the shaft 500 relative to the housing 600. Since the second dynamic pressure generation groove 132 has the same shape as the first dynamic pressure generation groove 131, the illustration of the second dynamic pressure generation groove 132 seen from the side-surface side will be omitted.

A plurality of the first dynamic pressure generation groove 131 and a plurality of the second dynamic pressure generation groove 132 are provided over the entire circumference excluding the vicinity of the abutment portion 110 with intervals in the circumferential direction. Since the first dynamic pressure generation groove 131 extends from a position close to the first side surface 100A with respect to the center of width in the axial direction to the first side surface 100A and the second dynamic pressure generation groove 132 extends from a position close to the second side surface 1008 with respect to the center of width in the axial direction to the second side surface 1008, the outer peripheral surface of the seal ring 100 has an annular protruding portion 120 extending circumferentially at the center of width in the axial direction. A rib-shaped first rib portion 141 is formed between adjacent first dynamic pressure generation grooves 131. Further, a rib-shaped second rib portion 142 is also formed between adjacent second dynamic pressure generation grooves 132. The outer peripheral surface in the vicinity of the abutment portion 110, the outer peripheral surface of the protruding portion 120, the outer peripheral surfaces of the plurality of first rib portion 141, and the outer peripheral surfaces of the plurality of second rib portion 142 forms a continuous surface. These form an annular continuous sealing surface (columnar sealing surface) of the seal ring 100 on the outer peripheral surface side.

The protruding portion 120 with smaller width can reduces torque further. On the other hand, the protruding portion 120 with too small width may decrease sealing performance and durability. Thus, the width of the protruding portion 120 may be determined depending on use environments as small as possible while the sealing performance and the durability can be maintained. For example, the width of the protruding portion 120 may be set to about 0.3 mm or more and 0.7 mm or less for the seal ring 100 having 19.9 mm width.

A distance from a side surface of the protruding portion 120 on the first side surface side to the second side surface 1006 of the seal ring 100 (denoted by the length of a region H1 in FIG. 5) and a distance from a side surface of the protruding portion 120 on the second side surface side to the first side surface 100A of the seal ring 100 are set to be smaller than a distance from the inner peripheral surface of the seal ring 100 to the outer peripheral surface of the protruding portion 120 (denoted by the length of a region T1 in FIG. 5). The distance from the side surface of the protruding portion 120 on the first side surface side to the second side surface 1006 of the seal ring 100 is set to equal to the distance from the side surface of the protruding portion 120 on the second side surface side to the first side surface 100A of the seal ring 100. The region H1 can be regarded as a region from a side surface of the protruding portion 120 on a high pressure side to a side surface of the seal ring 100 on a low pressure side in use.

The above described relation of the region H1 and the region T1 configures the seal ring 100 such that an effective pressure receiving area for pressure from the inner peripheral surface side, which contributes to force by which the seal ring 100 is pushed against the inner peripheral surface 610 of the shaft hole by fluid pressure, is narrower than an effective pressure receiving area for pressure from the side surface side, which contributes to force by which the seal ring 100 is pushed against the low pressure-side side wall surface of the annular groove 510 by fluid pressure.

<Mechanism of Seal Ring in Use>

Referring to FIGS. 4 to 6, a mechanism of the seal ring 100 in use will be described. FIG. 4 illustrates a no-load state in which an engine is stopped and fluid pressure on the region P side and fluid pressure on the region Q side across the seal ring 100 are equal. FIGS. 5 and 6 illustrate a state in which the engine is started and differential pressure is generated across the seal ring 100 (a state in which the fluid pressure on the region P side is higher than the fluid pressure on the region Q side).

Since there is no difference in pressure between the region P and the region Q and fluid pressure from the inner peripheral surface side does not act in the no-load state, the seal ring 100 can be positioned away from the left side wall surface of the annular groove 510 in FIG. 4 and the inner peripheral surface 610 of the shaft hole.

In the state in which the engine is started and the differential pressure is generated, the seal ring 100 is in close contact with the side wall surface of the annular groove 510 on the low pressure side (on the region Q side in FIGS. 5 and 6), and slides on the inner peripheral surface 610 of the shaft hole (see FIGS. 5 and 6).

<Advantages of Seal Ring According to Present Embodiment>

A more detailed explanation will be provided about the configuration of the seal ring 100 where it comes into close contact with the side wall surface of the annular groove 510 on the low pressure side and slides on the inner peripheral surface 610 of the shaft hole in the housing 600. Since the length of the region H1 illustrated in FIG. 5 is set smaller than the length of the region T1 in the seal ring 100, an effective pressure receiving area for pressure from the inner peripheral surface side, which contributes to force by which the seal ring 100 is pushed against the inner peripheral surface 610 of the shaft hole by fluid pressure, is narrower than an effective pressure receiving area for pressure from the side surface side, which contributes to force by which the seal ring 100 is pushed against the low pressure-side side wall surface of the annular groove 510 by fluid pressure.

The region T1 is an effective pressure receiving region of the seal ring 100 when the seal ring 100 is pushed by fluid to be sealed from the high pressure side to the low pressure side in the axial direction. The area of the region T1 extending along the entire circumference is an effective pressure receiving area in the axial direction. The region H1 is an effective pressure receiving region of the seal ring 100 when the seal ring 100 is pushed radially outward by fluid to be sealed from the inner peripheral surface side to the outer peripheral surface side, because the region where the high pressure-side dynamic pressure generation groove (in the present embodiment, the first dynamic pressure generation groove 131 on the region P side) is provided, fluid pressure acts from both sides in the radial direction such that forces applied to the seal ring 100 in the radial direction are canceled. The area of the region H1 extending along the entire circumference is an effective pressure receiving area in the radial direction.

Thus, when a differential pressure is generated between both sides of the seal ring 100, an effective pressure receiving region (pressure receiving area) for the seal ring 100 in the radially outward direction is smaller than that in the axial direction. This prevents the seal ring 100 from sliding on the annular groove 510 and allows the outer peripheral surface of the seal ring 100 to slide on the inner peripheral surface 610 of the shaft hole with surety. This stabilizes the area of a sliding portion irrespective of the size of an annular gap between the shaft 500 and the housing 600. Thus, the sealing performance can be stabilized. Since the outer peripheral surface side of the seal ring 100 is the sliding surface, a lubricant film (here, oil film) is more easily formed by fluid to be sealed as compared with a seal ring that slides on the side wall surface of the annular groove. This can reduce sliding torque further, because a wedge effect is exhibited at a minute gap portion between the outer peripheral surface of the seal ring 100 and the inner peripheral surface of the shaft hole when the outer peripheral surface of the seal ring 100 slides on the inner peripheral surface of the shaft hole.

When differential pressure is generated between both sides of the seal ring 100, fluid to be sealed is guided into a dynamic pressure generation groove on the high pressure side of the pair of dynamic pressure generation grooves (in the present embodiment, the first dynamic pressure generation groove 131). This enables the fluid pressure to act on the seal ring 100 from each of the outer peripheral surface side and the inner peripheral surface side even when the fluid pressure increases in a region where the first dynamic pressure generation groove 131 is provided. Thus, the fluid pressures can be canceled. How the fluid pressure acts on the seal ring 100 is illustrated by arrows in FIG. 5. Thus, an increase in pressure caused by the increase in fluid pressure toward the outer peripheral surface by the seal ring 100 can be suppressed, and hence sliding torque can be kept low.

Since the present embodiment has the plurality of first dynamic pressure generation groove 131 and the plurality of second dynamic pressure generation groove 132 formed over the entire circumference excluding the vicinity of the abutment portion 110 with intervals in the circumferential direction, the first dynamic pressure generation grooves 131 and the second dynamic pressure generation grooves 132 are provided over the wide range of the outer peripheral surface of the seal ring 100. This reduces the sliding area between the seal ring 100 and the inner peripheral surface 610 of the shaft hole in the housing 600 as much as possible, thus sliding torque can be significantly reduced.

Now a detailed explanation on the generation of dynamic pressure with the relative rotation of the housing 600 and the seal ring 100 by the first dynamic pressure generation grooves 131 and the second dynamic pressure generation grooves 132 in the seal ring 100. Since the side surface (side surface 131a or side surface 131b) of the first dynamic pressure generation groove 131 on the upstream side in the rotation direction of the seal ring 100 relative to the housing 600 is formed to have an inclined surface whose depth gradually decreases toward the upstream side, fluid to be sealed in the first dynamic pressure generation groove 131 flows from the inside of the groove to the outer peripheral surface of the seal ring 100 when the housing 600 and the seal ring 100 rotate relatively so that dynamic pressure is generated. The same applies to a mechanism in which dynamic pressure is generated by the second dynamic pressure generation groove 132. Such dynamic pressure gives a force to put off the outer peripheral surface of the seal ring 100 from the inner peripheral surface 610 of the shaft hole in the housing 600. In addition, the thickness of the film of the fluid to be sealed formed between the outer peripheral surface of the seal ring 100 and the inner peripheral surface 610 of the shaft hole in the housing 600 can be increased. Thus, sliding torque (rotation torque) can be further reduced.

Since the reduction in sliding torque achieved as described above can suppress generation of heat by sliding, the seal ring 100 can be suitably used even under high-speed and high-pressure environmental conditions. Since the seal ring 100 does not slide on the side surface of the annular groove 510, soft material such as aluminum can be used for the material of the shaft 500.

The plurality of first rib portion 141 and second rib portions 142 of the seal ring 100 can increase the rigidity of the seal ring 100, and in particular, the strength against a twisting direction. Thus, the deformation of the seal ring 100 is suppressed even in environments where differential pressure increases, and stable sealing performance is exhibited. In addition, the seal ring 100 can be prevented from being inclined with respect to the annular groove 510.

Modified Examples

Figure 7:
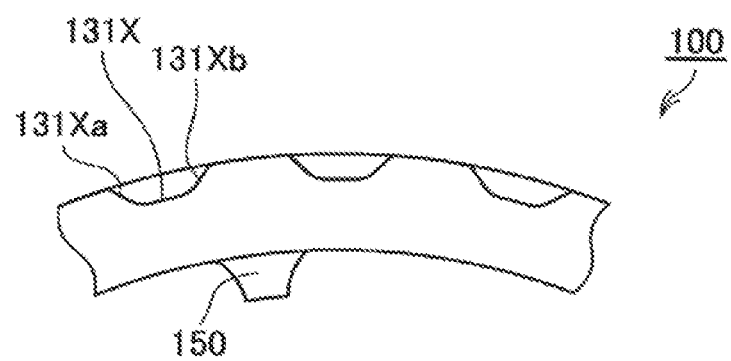
FIG. 7 is a partial enlarged rear view of a seal ring according to a first modification.

Although the first dynamic pressure generation groove 131 and the second dynamic pressure generation groove 132 have the side surfaces on both sides in the circumferential direction formed to have the so-called R surfaces in the above described embodiment, the first dynamic pressure generation groove and the second dynamic pressure generation groove are not limited to the configuration, and various known techniques can be employed as long as dynamic pressure is generated with the relative rotation between the housing 600 and the seal ring 100. For example, a first modification as illustrated in FIG. 7 may include a dynamic pressure generation groove 131X having side surfaces 131Xa and 131Xb on both sides in the circumferential direction, each of the side surfaces having a planar inclined surface whose depth becomes gradually shallower toward both ends. The first modification can give the same effects as in the above described first embodiment.

Figure 8:
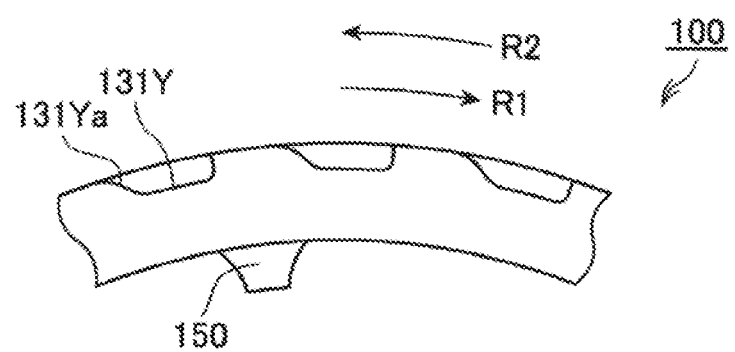
FIG. 8 is a partial enlarged side view of a seal ring according to a second modification.

A second modification as illustrated in FIG. 8 may include a dynamic pressure generation groove 131Y having a side surface 131Ya on one side in the circumferential direction, the side surface having an R surface similarly to the first embodiment. The side surface 131Ya on the upstream side in the rotation direction of the seal ring 100 relative to the housing 600 may have an inclined surface (R surface) whose depth becomes gradually shallower toward the upstream side in the dynamic pressure generation groove 131Y of the second modification. A rotation direction of the seal ring 100 relative to the housing 600 is denoted by the arrow R1 in FIG. 8. When the shaft 500 (and the seal ring 100) rotates relative to the housing 600, fluid to be sealed flows in the direction denoted by the arrow R2 in FIG. 8 with respect to the seal ring 100.

Figure 9:
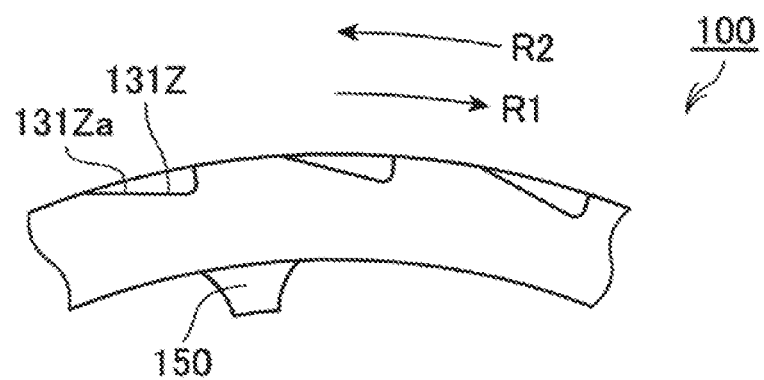
FIG. 9 is a partial enlarged side view of a seal ring according to a third modification.
Figure 10:
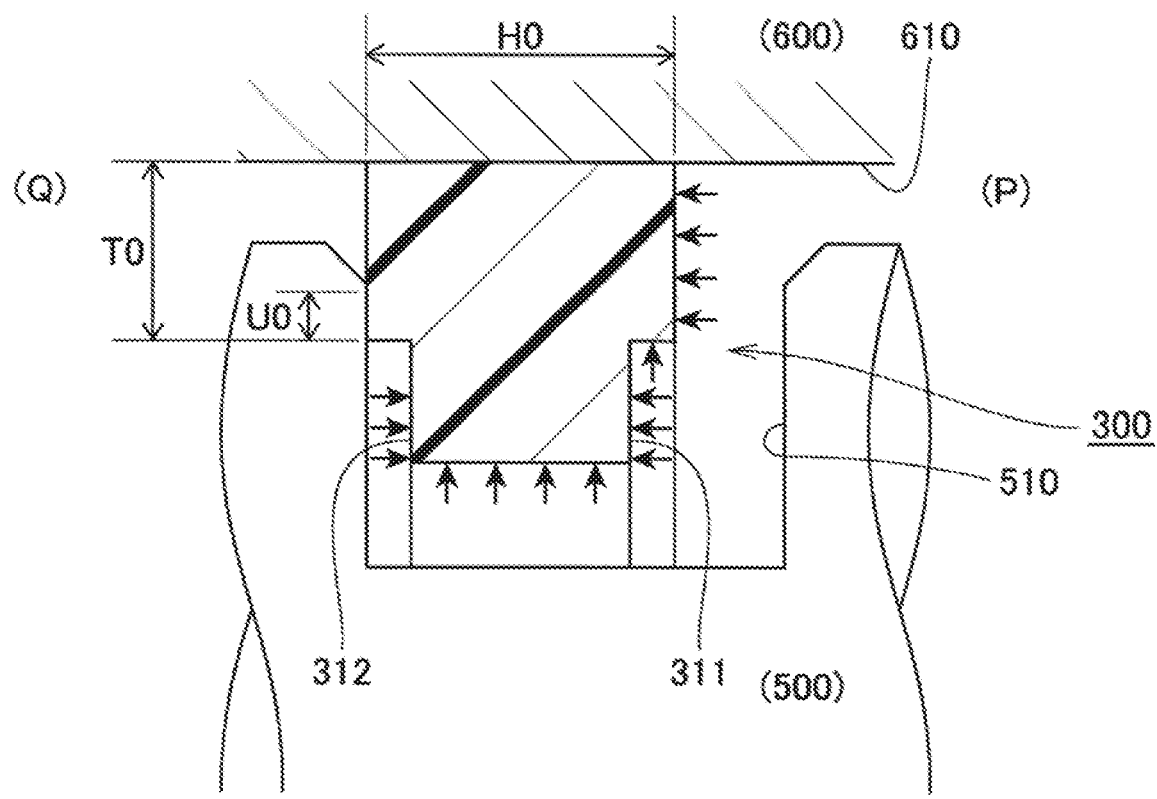
FIG. 10 is a schematic cross-sectional view illustrating a seal ring in use according to a conventional example.

A third modification as illustrated in FIG. 9 may include a dynamic pressure generation groove 131Z having a side surface 131Za on one side in the circumferential direction, the side surface having a planar inclined surface similarly to the first modification. The side surface 131Za may be regarded as a groove bottom surface. The side surface 131Za on the upstream side in the rotation direction of the seal ring 100 relative to the housing 600 may have an inclined surface whose depth becomes gradually shallower toward the upstream side in the dynamic pressure generation groove 131Z of the third modification. A rotation direction of the seal ring 100 relative to the housing 600 is denoted by the arrow R1 in FIG. 9. When the shaft 500 (and the seal ring 100) rotates relative to the housing 600, fluid to be sealed flows in the direction denoted by the arrow R2 in FIG. 9 with respect to the seal ring 100.

REFERENCE SIGNS LIST

100 Seal ring
100A First side surface
100B Second side surface
110 Abutment portion
111a First fitting protruding portion
111b Second fitting protruding portion
112a First fitting recess
112b Second fitting recess
120 Protruding portion
131 First dynamic pressure generation groove
132 Second dynamic pressure generation groove
131X, 131Y, 131Z Dynamic pressure generation groove
131a, 131b, 131Xa, 131Xb, 131Ya, 131Za Side surface
141 First rib portion
142 Second rib portion
150 Protrusion
500 Shaft
510 Annular groove
600 Housing
610 Inner peripheral surface

The invention claimed is:

1. A seal ring, comprising:
an annular seal body having a first side surface and a second side surface facing in opposite axial directions relative to a center axis of the annular seal body, an outer peripheral surface extending axially between radially outer peripheral edges of the first and second side surfaces and an inner peripheral surface extending axially between inner peripheral edges of the first and second side surfaces
the outer peripheral surface including an annular protruding portion extending around a circumference of the annular seal body and including a plurality of rib portions extending from the annular protruding portion in both axial directions relative to the center axis of the annular seal body and terminating at the first and second side surfaces respectively, the outer peripheral surface including a plurality of first dynamic pressure generation grooves extending axially from the first side surface of the seal ring to the annular protruding portion; and
the outer peripheral surface including a plurality of second dynamic pressure generation grooves extending axially from the second side surface of the seal ring to the annular protruding portion.

2. The seal ring according to claim 1, wherein
a side surface of the plurality of first dynamic pressure generation grooves adjacent to one of the plurality of rib portions is formed by an inclined surface which becomes gradually shallower toward the rib portions, and
a side surface of the plurality of second dynamic pressure generation grooves adjacent to one of the plurality of rib portions is formed by an inclined surface which becomes gradually shallower toward the rib portions.

3. The seal ring according to claim 1, wherein a plurality of protrusion that protrude radially inward are provided on the inner peripheral surface side with intervals in the circumferential direction.

4. The seal ring according to claim 2, wherein a plurality of protrusion that protrude radially inward are provided on the inner peripheral surface side with intervals in the circumferential direction.

* * * * *